United States Patent Office 3,529,021
Patented Sept. 15, 1970

3,529,021
TEREPHTHALIC ACID PURIFICATION PROCESS
Arnold F. Stancell, New Brunswick, N.J., and Andrew J. Foglia, Brooklyn, N.Y., assignors to Mobil Oil Corporation, a corporation of New York
No Drawing. Filed Mar. 17, 1966, Ser. No. 535,000
Int. Cl. C07c 51/42
U.S. Cl. 260—525                               7 Claims

ABSTRACT OF THE DISCLOSURE

The purification of impure or crude terephthalic acid to reduce its content of such impurities as para-carboxybenzaldehyde is accomplished by non-catalytic treatment at elevated temperatures (e.g., at 600–750° F.) of the crude acid in the vapor state by admixture with an oxygen-rich gas which preferably contains steam as well as over 50 mole percent of oxygen; then the terephthalic acid is condensed from the vapor mixture as a purified solid product by cooling.

---

This invention relates to the purification of crude terephthalic acid, and more particularly to the purification of terephthalic acid containing impurities which include para-carboxybenzaldehyde.

The major impurities present in terephthalic acid prepared by catalytic oxidation of p-xylene result from incomplete oxidation. A particularly undesirable product of such incomplete oxidation is para-carboxybenzaldehyde which acts as a chain stopper during polyesterification of the terephthalic acid and thereby imparts undesirable properties to the polyester product. Accordingly, a process whereby impurities such as para-carboxybenzaldehyde can be substantially removed from crude terephthalic acid is highly desirable.

Although the process of this invention may be used for purification of terephthalic acid prepared by other processes, it is especially suitable for purifying crude terephthalic acid obtained by the catalytic oxidation of p-xylene, for example by processes of the type described in U.S. Pats. 2,833,816, 2,853,514, 3,036,122 and others. By such processes, terephthalic acid is prepared by contacting p-xylene with a gas containing oxygen in the presence of a suitable catalyst to oxidize the methyl groups of the p-xylene to carboxylic acid groups. The process of this invention is useful for purification of crude terephthalic acid obtained directly from such a p-xylene oxidation process, e.g. a crude terephthalic acid containing up to 15,000 p.p.m. or more of para-carboxybenzaldehyde, and it is particularly suitable for purification of terephthalic acid from which impurities such as para-carboxybenzaldehyde have been already partially removed, e.g. by leaching or washing.

In accordance with this invention, a crude terephthalic acid containing impurities including para-carboxybenzaldehyde is purified by contacting the crude terephthalic acid in vaporized form with a free oxygen containing gaseous medium, and thereafter condensing a substantial proportion of the vaporized terephthalic acid in the resulting gaseous mixture to provide a condensate containing terephthalic acid having a substantially lower concentration of para-carboxybenzaldehyde than the crude terephthalic acid.

In a preferred embodiment of the process of this invention, particles of solid crude terephthalic acid are entrained in a heated free oxygen containing carrier gas and vaporized therein by the sensible heat of the carrier gas and/or by the use of supplementary heating means. For example, the solid crude terephthalic acid can be advantageously fed at approximately ambient temperature into a rapidly moving stream of a carrier gas which is preheated, preferably to between about 400° and about 1000° F., and even more preferably to between about 600° and about 810° F., after which the resulting gaseous stream containing entrained solid acid can be further heated, e.g. by passing the stream through a vaporization coil, to complete the vaporization of the solid acid in the stream.

In such a preferred embodiment, the carrier gas advantageously contains oxygen in an amount sufficient to effect a substantial reduction of the concentration of para-carboxybenzaldehyde in the crude terephthalic acid which is vaporized in the carrier gas in accordance with the process of this invention. Preferably, the oxygen is present in a proportion of more than about 50 mole percent, and even more preferably between about 60 and about 99 mole percent of the carrier gas. In general, and within the foregoing range of mole percentages of oxygen, the extent to which crude terephthalic acid is purified by the process of this invention is increased by an increase in the proportion of free oxygen in the gaseous medium with which the crude terephthalic acid is contacted.

The carrier gas can also contain, in addition to oxygen, any other gas or gaseous mixture which is inert or substantially inert to terephthalic acid under the conditions of the process, which are more fully defined hereinafter. Thus, the carrier gas can contain an inert gas such as nitrogen, steam, etc. For example, use of steam in a proportion of at least about one mole percent of the carrier gas or, if desired, in a much higher proportion, is highly preferred as the presence of steam generally inhibits undesirable dehydration of the terephthalic acid to its anhydride.

In the process of this invention, the vaporized crude terephthalic acid can be contacted with any quantity of the free oxygen containing gaseous medium which is sufficient to result in substantial purification of the crude terephthalic acid. In the embodiment in which particles of the crude terephthalic acid are vaporized in a stream of a free oxygen containing gaseous medium, the gaseous medium is preferably employed in a quantity which is adequate to transport the crude terephthalic acid particles and to provide sensible heat in an amount which is sufficient for the desired vaporization of the terephthalic acid, or together with the heat supplied by supplementary heating means, to vaporize substantially all of the crude terephthalic acid in the carrier gas stream. For example, when the carrier gas employed in preferred embodiments of the invention is substantially comprised of oxygen and steam, the process can be conveniently carried out with up to about 10 mole percent of vaporized terephthalic acid in the carrier gas, although larger amounts of the crude terephthalic acid can be vaporized in the carrier gas for contact therewith when desirable in view of other process conditions, e.g. the flow rate of the carrier gas stream; the carrier gas temperature, etc.

The temperature at which the vaporized crude terephthalic acid is contacted with a free oxygen containing gaseous medium in accordance with this invention need not be higher than the lowest temperature at which the crude terephthalic acid will vaporize and diffuse in the gaseous medium. In general, contact of the vaporized crude terephthalic acid with the gaseous medium is carried out at a temperature below about 1000° F., and preferably at a temperature in excess of 600° F. up to about 750° F.

The time for which the vaporized crude terephthalic acid is contacted with the free oxygen containing gaseous medium need only be long enough to result in substantial purification of the vaporized terephthalic acid and can be varied in most cases over a wide range, for example from a fraction of a second up to a few minutes or longer. The most desirable length of time generally depends on other process conditions, such as the temperature of the gaseous medium, etc., but good results are usually obtained by contacting the crude terephthalic acid in vaporized form with the gaseous medium for a fraction of a minute, and in most instances for not longer than a few seconds.

Thereafter, the vaporized terephthalic acid can be separated from the resulting gaseous mixture by condensation. Although condensation of the acid can be carried out by any suitable technique, including cooling by heat exchange, it is often desirable to accomplish the desired condensation by combining a cooling medium with the gaseous mixture containing the vaporized terephthalic acid. Such a cooling medium should be inert to terephthalic acid at the temperature at which it is combined therewith in the present process, and can be similar in nature to the inert gas or gases which may be present with free oxygen in the gaseous medium with which the vaporized terephthalic acid is contacted in accordance with this invention.

Thus, it is generally satisfactory to employ a cooling medium containing steam or water heated to a temperature sufficiently below that of the vaporized terephthalic acid and sufficient in quantity that combination thereof with the gaseous mixture containing the terephthalic acid vapor will fractionally condense the mixture. That is, combination of the cooling medium with the gaseous mixture is desirably carried out to condense a substantial proportion of the acid vapor therein without causing undesirable condensation of other constituents of the process stream, e.g. steam, impurities which remain in vapor phase at temperatures lower than the condensation point of terephthalic acid, etc. For example, a temperature between 485° and 550° F. is generally preferred when condensation is carried out at approximately atmospheric pressure, although the condensation can be carried out by cooling the gaseous mixture containing the acid vapor to any temperature low enough to condense terephthalic acid from the mixture. Following condensation, the solid terephthalic acid product can be separated from the cooled mixture by any appropriate method, e.g. by the use of a cyclone separator, filter or bag collector.

The following specific examples are included to illustrate that terephthalic acid which is condensed after contact in vaporized form with a free oxygen containing gaseous medium as described hereinbefore contains substantially decreased amounts of impurities, such as para-carboxybenzaldehyde, which were present before contact of the vaporized terephthalic acid with the gaseous medium in accordance with the process of this invention.

EXAMPLE I

A gaseous stream containing 4 mole percent oxygen and 6 mole percent steam was passed through a supported bed of solid particulate crude terephthalic acid at 670° F. and under approximately atmospheric pressure. The crude terephthalic acid in the bed contained 1180 p.p.m. of para-carboxybenzaldehyde. After emergence from the bed, the gaseous stream containing vaporized crude terephthalic acid was heated to 710° F., after which the organic vapors therein were substantially completely condensed by passage of the stream through a water-cooled condenser. The time during which the crude terephthalic acid had been contacted in vaporized form with the gaseous stream of oxygen and steam was approximately 0.6 second. Analysis of the condensate showed that it contained substantially all of the terephthalic acid which had vaporized from the bed and that the concentration of para-carboxybenzaldehyde in the terephthalic acid product, which was white in color, had been reduced by 35% by the procedure of this example.

EXAMPLE II

When the procedure of Example I was repeated with the exception that the gaseous stream in which the crude terephthalic acid was vaporized contained 76 mole percent oxygen and 24 mole percent steam, it was found that the condensate contained substantially all of the terephthalic acid which had vaporized from the bed and that the concentration of para-carboxybenzaldehyde in the terephthalic acid product had been reduced by 11%.

Although the process of this invention has been illustrated with preferred embodiments, it is to be understood that modifications and variations may be employed without departing from the spirit and scope of this invention, as those skilled in the art will readily understand. Such variations and modifications are therefore considered to be within the purview and scope of the appended claims.

We claim:
1. A process for the purification of crude terephthalic acid which comprises contacting crude terephthalic acid containing para-carboxybenzaldehyde in vaporized form with a gaseous medium comprising more than about 50 mole percent free oxygen at a temperature between about 600° and about 1000° F., and thereafter condensing a substantial proportion of the vaporized terephthalic acid in the resulting gaseous mixture to provide a condensate containing terephthalic acid having a substantially lower concentration of paracarboxybenzaldehyde than the crude terephthalic acid.

2. A process, as defined in claim 1, in which the gaseous medium comprises between about 60 and about 99 mole percent free oxygen.

3. A process, as defined in claim 1, in which the gaseous medium comprises steam.

4. A process, as defined in claim 1, in which the crude terephthalic acid is contacted with the free oxygen containing gaseous medium by vaporizing the crude terephthalic acid in a stream of the gaseous medium.

5. A process, as defined in claim 1, in which the crude terephthalic acid is contacted with the free oxygen containing gaseous medium at a temperature between about 600° and about 750° F.

6. A process, as defined in claim 1, in which the crude terephthalic acid is contacted with the free oxygen containing gaseous medium for a fraction of a minute.

7. A process, as defined in claim 1, in which the vaporized terephthalic acid is fractionally condensed from the resulting gaseous mixture.

References Cited

UNITED STATES PATENTS

| 3,431,296 | 3/1969 | Ichikawa et al. | 260—525 |
| 2,899,466 | 8/1959 | O'Neill | 260—525 |

FOREIGN PATENTS

| 982,629 | 2/1965 | Great Britain. |
| 983,677 | 2/1965 | Great Britain. |

BERNARD HELFIN, Primary Examiner